Aug. 23, 1938.　　　F. HORTON　　　2,127,773
LIQUID METER
Filed Sept. 8, 1936　　　3 Sheets-Sheet 1
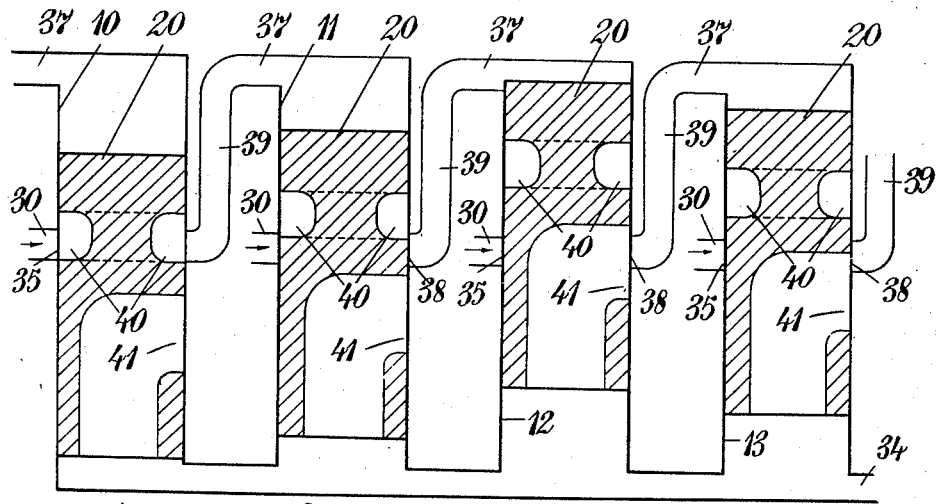
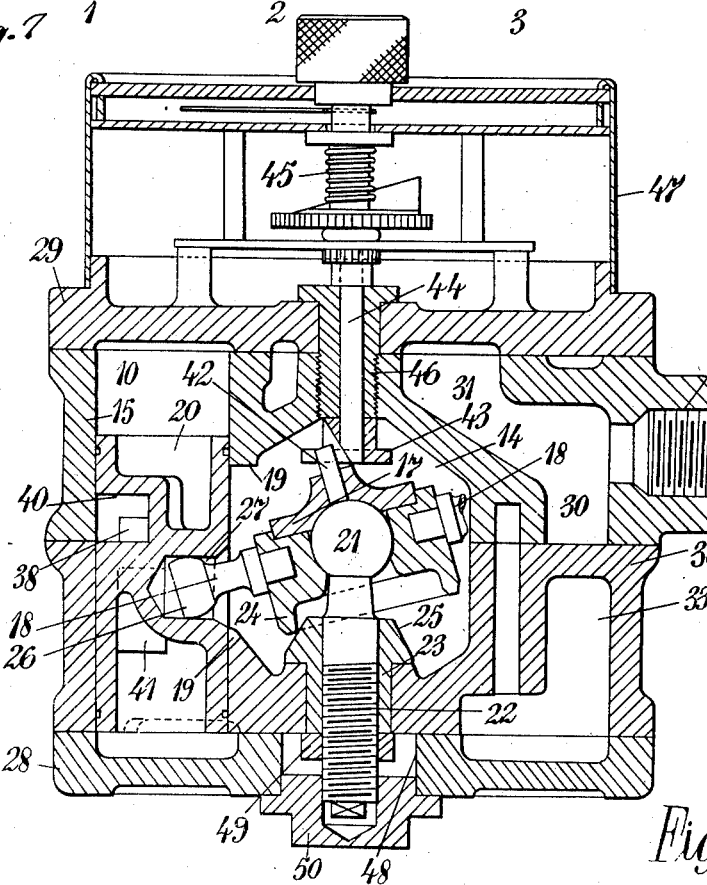
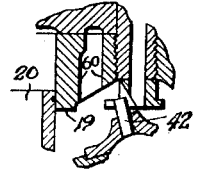
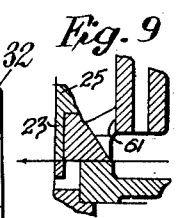
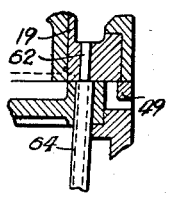
F. Horton
INVENTOR

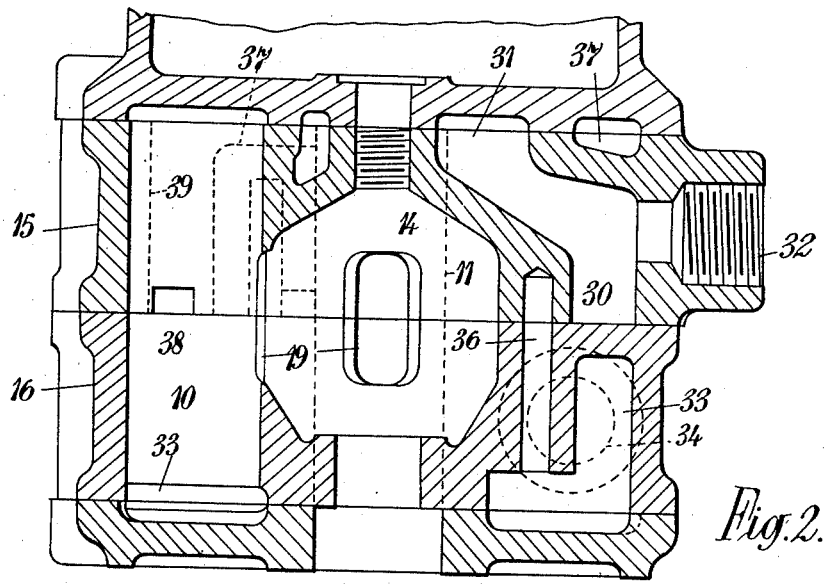
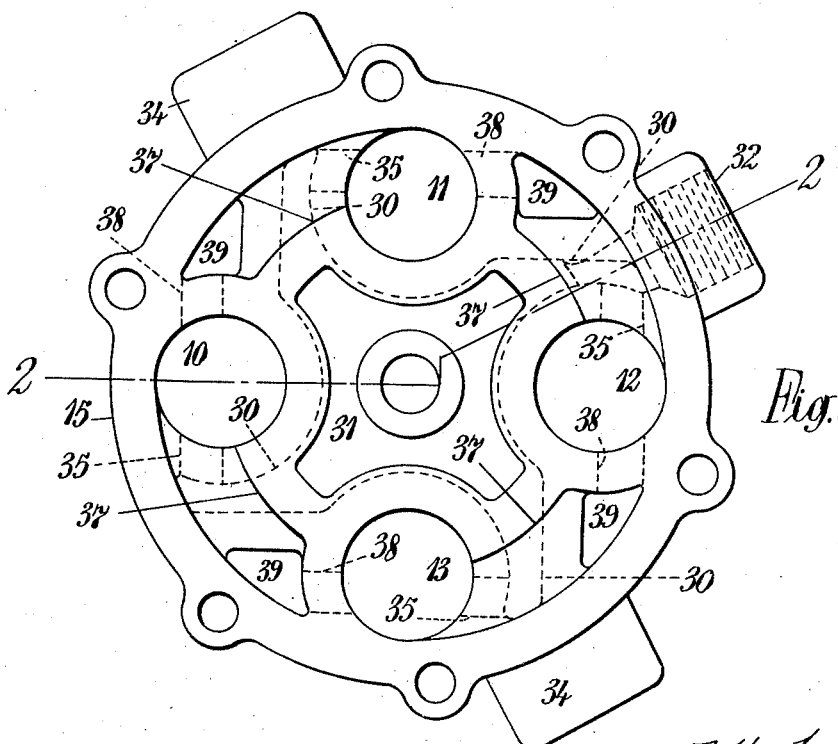

Patented Aug. 23, 1938

2,127,773

UNITED STATES PATENT OFFICE 2,127,773

LIQUID METER

Frank Horton, London, England, assignor to Foreign Rights (Precision Meters) Limited, London, England Application September 8, 1936, Serial No. 99,845
In Great Britain December 27, 1935

8 Claims. (Cl. 73—244)

This invention relates to meters for measuring liquids, of the type in which the measurement is in accordance with the stroke or displacement of a pressure responsive device or piston.

An object of the invention is to provide an improved form of meter which while being of universal application in the metering of liquids is of particular advantage when dealing with very thick substances such as gear case oils or other very viscous liquids.

A further object is to provide an improved and simplified design of meter which may be readily taken apart for cleaning and reassembled without altering the calibration, whereby the meter is particularly adaptable to the conditions imposed, for example in connection with the measuring of milk or other liquid foodstuffs.

The invention consists in a liquid meter comprising a series of cylinders arranged about a central axis, the axes of the cylinders being parallel to the central axis, the pistons being coupled together by a swash plate device, each piston functioning as a valve for an adjacent cylinder.

The cylinders preferably enclose a central space in which the swash plate device is located.

According to a further feature, the space occupied by the swash plate or spider coupling the pistons together is isolated from the pressure and delivery spaces whereby the mechanism is unaffected by the nature of the liquid being metered, and the necessity of glands for the indicating spindle or other parts is avoided.

Further features of invention will be hereinafter described and defined in the claims.

In the accompanying drawings:—

Figure 1 is a cross sectional elevation of a meter according to the invention, the section being taken through one of the cylinders and the inlet.

Figure 2 is a similar cross section of the cylinder block and covers the section being taken on the lines 2—2 of Figure 3.

Figure 3 is a plan of the cylinder block with the cover plate removed.

Figure 7 is a diagram showing the operation of the meter.

Figures 8, 9, 10 are detail views of parts of the meter shown in Figure 1 and incorporating certain modifications.

Figure 4:
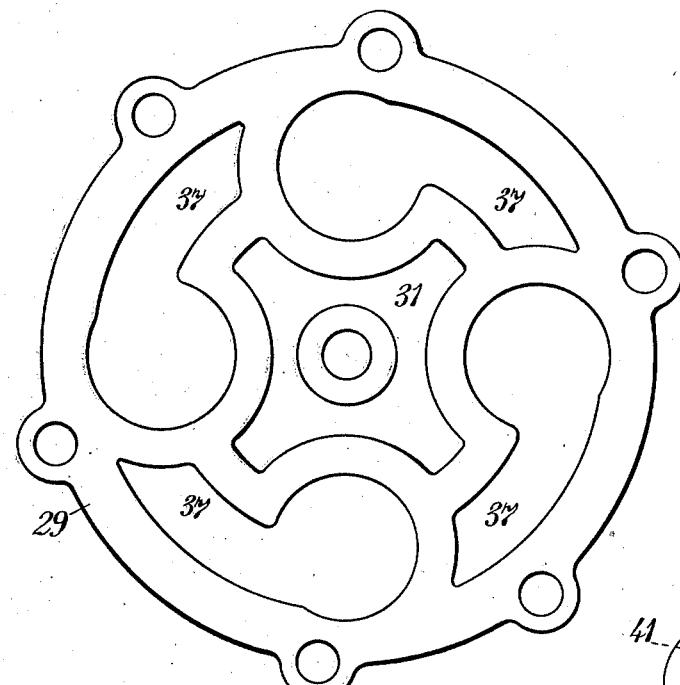
Figure 4 is a view of the inner face of the upper cover plate.
Figure 6:
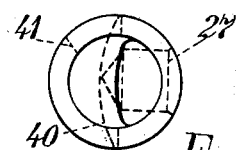
Figure 6 is a plan of a piston.
Figure 5:
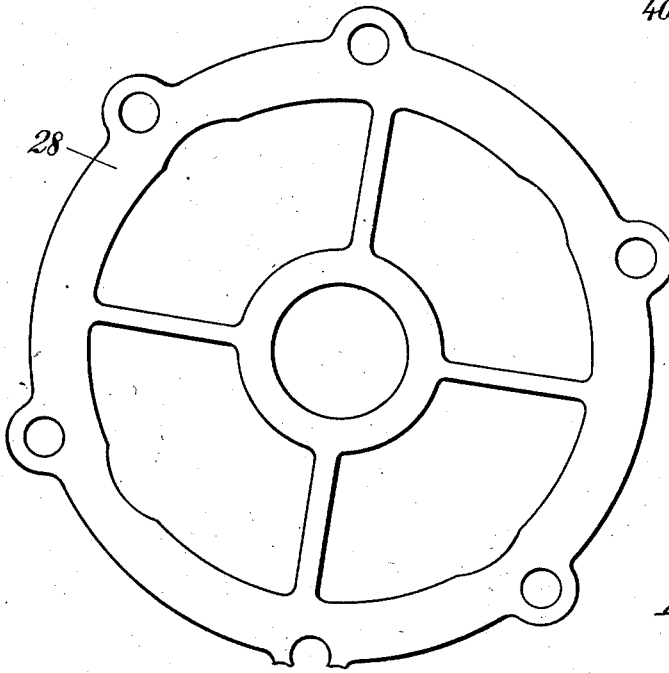
Figure 5 is a view of the inner face of the lower cover plate.

In carrying the invention into effect according to one convenient mode in the construction of a meter adapted primarily to measure very thick oils or semi-solid oils such as gear case oils, a cylinder block is provided in which there are four cylinders, 10, 11, 12, 13 arranged in a circle about a central chamber 14, the axes of the cylinders being parallel and equally spaced at 90° from one another. The cylinder bores extend completely through the block which for convenience of construction is formed in parts upper and lower parts 15 and 16 divided by a plane at right-angles to the axes of the cylinders. The central chamber 14 which is enlarged adjacent the division plane accommodates a swash plate device 17 or spider element which has four radial arms 18 extending through slots 19 in the inner walls of the cylinders whereby they are connected to pistons 20 located in the cylinders.

The swash plate or spider is mounted upon a ball 21 carried by a post 22 located on the central axis. The post is screwed into a central boss 23 formed by a sleeve which is driven into an aperture in the lower part 16 of the cylinder block.

The swash plate is provided with a downwardly extending ring or annulus 24 which is adapted to have a rolling contact with a coned seating surface 25 formed on the boss 23. By adjusting the screwed post the inclination of the swash plate may be varied and the stroke of the pistons altered whereby calibration of the meter may be made.

The arms 18 of the swash plate or spider are provided with ball ends 26 which engage in appropriate lateral recesses 27 in the pistons 20.

The cylinder block has lower and upper end plates 28 and 29 screwed thereto to form appropriate passages for the liquid to be measured. Passages 30 in the upper part 15 of the cylinder block are connected to central space 31 which communicates with a common inlet 32 while recesses 33 in the lower part are connected to a common outlet 34 of which two are provided, the one not being used being closed by a suitable plug. The passages 30 communicate with ports 35 opening into the cylinders while the lower ends of the cylinders are connected to the outlet 34.

The lower block 16 is provided with transverse walls 36 dividing the pressure from the delivery passages. The lower ends of the cylinders and thus the lower faces of the pistons are always open to the discharge side of the meter.

The upper end of each cylinder is connected by a curved passage 37 formed partly in the upper block and in the cover plate 29, to a port 38 in the wall of the preceding cylinder by passages 39 extending parallel to the axes of the cylinders.

The ports 38 lie opposite to the ports 35. Communication between the ports 35 and 38 of each cylinder is controlled by the piston 26 of such cylinder which is provided with a transverse passage 40. When the passage 40 of a piston uncovers its ports 35 and 38 liquid flows from the central space 31 through the appropriate passage 36, port 35, piston passage 40, port 38, passage 39 and curved passage 37 to the upper end of the next cylinder. Such action occurs when each piston is at the lower end of its stroke.

The pistons are also provided with side ports 41 spaced from the passages 40, and opening into the lower open end of the pistons which communicate with the discharge side of the meter.

When a piston is at the upper end of its stroke its side port 41 is adapted to register with the port 38 of its cylinder whereby the upper end of the succeeding cylinder is open to discharge through the curved passage 37, passage 39, port 38 and side port 41 of the previous piston.

Thus it will be appreciated that each piston in turn acts as a valve first to control the flow into the upper end of the succeeding cylinder and afterwards to control the discharge therefrom.

Considering all four cylinders as shown diagrammatically in Figure 7 and assuming that No. 1 piston is at the lower end of its stroke and is admitting liquid to the top end of No. 2 cylinder, No. 2 piston will be travelling downward to a position to act as an inlet valve controlling the flow of liquid into the space above piston 3, and at the same time liquid will be entering the upper end of cylinder No. 2.

Piston No. 3 will be at the upper end of its stroke and about to travel downwardly receiving liquid above its piston. No. 4 piston will be nearly at the upper end of its stroke and travelling upwardly delivering liquid through piston 3 to the discharge side of the meter.

The swash plate device 17 is provided with an upstanding pin 42 engaging a lateral slot in the head 43 of a spindle 44 for a counting or registering device 45 of any convenient form. The spindle 44 is mounted in a sleeve 46 extending through the upper cover plate 29 and screwed into the upper block 15. By reason of the inner chamber 14 being isolated from the liquid being measured as the slots 19 through which the arms of the swash plate device are always covered by the pistons it will be appreciated that the spindle 44 will not require a gland or stuffing box.

The indicating or registering mechanism 45 is mounted upon the outer face of the covering plate 29, a suitable cover or casing 47 being provided.

The outer end of the screwed post or support 22 for the swash plate or spider 17 extends into a central aperture 48 in the lower cover 28 and is provided with a squared end for adjustment purposes. A lock nut 49 is provided for locking the spindle in its adjusted position. A cover plate 50 is provided for the aperture in the lower cover plate. By adjusting the screwed spindle or post 22 the stroke of the pistons may be varied and the meter calibrated. No packings are required for the post 22 as the chamber 14 is isolated from the liquid being measured.

The upper and lower parts 15 and 16 of the cylinder block (when the swash plate 17 and pistons 26 have been assembled) are bolted together or otherwise fixed, and do not require separating except for repair if such be required, but the upper and lower cover plates 29 and 28 are fixed in position so that they may be readily removed when it is required to clean the meter, for example when it is used for measuring milk, and it will be found that the only parts requiring cleaning may be reached with ease when the covers 28 and 29 are taken off, without it being necessary to interfere with the pistons or the swash plate so that when reassembled the meter will not require recalibration, provided of course that the screwed post 22 and lock nut 49 have not been tampered with.

By reason of the isolation of the swash plate 17 and transmission 42, 43, 44 to the indicating means from the liquid spaces of the meter and the absence of complicated valve mechanism, the meter will be found particularly useful in metering very heavy oils having a high viscosity. At the same time it will be obvious that the inner chamber 14 may be in communication with either the pressure or delivery side if it is preferred to immerse the mechanism in the medium being measured provided the viscosity of such would not affect the operation of the meter. Thus the inner chamber 14 may communicate with the pressure side through apertures 60, Figure 8. Alternatively the inner chamber 14 may communicate with the discharge side through apertures 61 in Figure 9. In such a case however, glands would be necessary in connection with the calibration adjustment means and registering spindle.

It may be found that after the meter has been in use for a considerable period liquid may collect in the chamber 14 owing to seepage, particularly when metering thin liquids. Such seepage liquid may be drained away from the chamber by the provision of apertures in the cylinder block and end caps, such apertures being indicated at 62, Figure 10. A draining pipe 64 Figure 10 may be provided in the apertures 62.

While four cylinders have been referred to in the particular description above it will be appreciated that three or more than four cylinders may be provided.

Where it is desired to meter large quantities in a relatively short time, the diameter and stroke of the pistons may be increased and/or a greater number of cylinders may be provided.

I claim:

1. A liquid meter operated by the pressure of the liquid, comprising a series of cylinders arranged about a central axis, pistons reciprocable in said cylinders, a swash plate device having nutatory motion operatively coupling the pistons together, each piston functioning as a valve for controlling the flow of liquid into and from the succeeding cylinder and means for adjusting the length of the stroke of the pistons to calibrate the meter.

2. A liquid meter operated by the pressure of the liquid, comprising a series of cylinders arranged about a central axis, the axes of the cylinders being parallel to said central axis, pistons reciprocable in said cylinders, a swash plate device having a nutatory motion operatively coupling the pistons together and located in the space enclosed by the cylinders, each piston functioning as a valve for controlling the flow of liquid into and from the succeeding cylinder and means for adjusting the length of the stroke of the pistons to calibrate the meter.

3. A liquid meter operated by the pressure of the liquid, comprising a cylinder block having a plurality of cylinder bores arranged about a central axis, said bores being parallel to said axis, a central chamber located between the cylinder bores, pistons reciprocable in the cylinder bores, each piston functioning as a valve for the succeeding cylinder, a swash plate device located in said central chamber and operatively coupling the pistons together, a pressure chamber in the upper part of the block above the swash plate device and adapted to be connected in turn with the upper end of each cylinder bore under the control of the piston in the preceding cylinder bore, and a common discharge chamber in the lower part of the block below the swash plate device to which liquid from the upper end of each cylinder bore is delivered in turn under control of the preceding piston.

4. A liquid meter as claimed in claim 3 wherein the central chamber is isolated from the pressure and discharge chambers.

5. A liquid meter operated by the pressure of the liquid, comprising a series of cylinders arranged about a central axis, pistons reciprocable in said cylinders, a swash plate device having a nutatory motion operatively coupling the pistons together, each piston having a transverse groove toward one end which controls the inlet of liquid into the succeeding cylinder, and a lateral port opening into an axial bore at its opposite end, said port controlling the discharge of liquid from said cylinder.

6. A liquid meter as claimed in claim 3, wherein the central chamber is in communication with the pressure side of the meter.

7. A liquid meter as claimed in claim 3 wherein the central chamber is in communication with the discharge side of the meter.

8. A liquid meter as claimed in claim 3 wherein the central chamber is isolated from the pressure and discharge chambers of the meter and wherein a draining conduit connects the central chamber with the exterior of the meter.

FRANK HORTON.